(12) United States Patent
Mercer (10) Patent No.: US 10,379,332 B2
(45) Date of Patent: Aug. 13, 2019

(54) STEREOSCOPIC VIEWING APPARATUS (71) Applicant: VISION ENGINEERING LIMITED, Surrey (GB)

(72) Inventor: Graham Peter Francis Mercer, Hampshire (GB)

(73) Assignee: VISION ENGINEERING LIMITED, Surrey (GB)

( * ) Notice: Subject to any disclaimer, the term of this patent is extended or adjusted under 35 U.S.C. 154(b) by 84 days.

(21) Appl. No.: 15/527,076

(22) PCT Filed: Nov. 5, 2015

(86) PCT No.: PCT/EP2015/075802
§ 371 (c)(1),
(2) Date: May 16, 2017

(87) PCT Pub. No.: WO2016/078923
PCT Pub. Date: May 26, 2016

(65) Prior Publication Data
US 2017/0336614 A1 Nov. 23, 2017

(30) Foreign Application Priority Data

Nov. 17, 2014 (GB) .................................. 1420352.5
Nov. 25, 2014 (GB) .................................. 1420926.6

(51) Int. Cl.
*G01J 1/20* (2006.01)
*G02B 21/22* (2006.01)
(Continued)

(52) U.S. Cl.
CPC ........... *G02B 21/22* (2013.01); *G02B 21/025* (2013.01); *G02B 21/04* (2013.01); *G02B 21/364* (2013.01);
(Continued)

(58) Field of Classification Search
CPC .... G02B 21/22; G02B 21/025; G02B 21/364; G02B 21/04; G02B 21/365;
(Continued)

(56) References Cited

U.S. PATENT DOCUMENTS 3,418,033 A * 12/1968 Hope .................. G02B 27/2235
359/472
4,205,224 A * 5/1980 Mecklenborg ..... G02B 27/0093
250/201.1
(Continued)

FOREIGN PATENT DOCUMENTS

CN 101533211 A 2/2011
DE 10 2011 114583 A1 4/2013
(Continued)

OTHER PUBLICATIONS

Examination Report for corresponding GB Application No. GB1420926.6 dated Feb. 22, 2016.*
(Continued)

*Primary Examiner* — Howard D Brown, Jr.
(74) *Attorney, Agent, or Firm* — Renner Otto Boisselle & Sklar, LLP (57) ABSTRACT

A viewing apparatus for producing a stereoscopic image for an observer, the viewing apparatus comprising: first and second video projectors for projecting respective ones of first and second video images of an object, the first and second images being different images which are one or both of spatially and angularly shifted in relation to the object so as to convey parallax between the images; a mirror arrangement comprising a concave mirror which receives light from the first and second video projectors, the mirror arrangement being located in relation to the first and second video projectors such that focussed images of the object are produced at the mirror arrangement; and a viewing lens for relaying exit pupils corresponding to each of the focussed
(Continued)

images as reflected by the mirror arrangement to a viewing plane so as to be viewable at the respective eyes of the observer as a stereoscopic image without use of adapted eyewear; wherein the video projectors comprise first and second video displays which are driven by first and second video signals to display respective ones of the first and second video images, and first and second optical arrangements for focussing light from the respective images as displayed by the first and second displays to the mirror arrangement.

14 Claims, 7 Drawing Sheets

(51) Int. Cl.
| | |
|---|---|
| *H04N 13/302* | (2018.01) |
| *H04N 13/398* | (2018.01) |
| *G02B 27/22* | (2018.01) |
| *G02B 21/02* | (2006.01) |
| *G02B 21/04* | (2006.01) |
| *G02B 21/36* | (2006.01) |
| *H04N 9/31* | (2006.01) |
| *H04N 13/363* | (2018.01) |
| *H04N 13/239* | (2018.01) |

(52) U.S. Cl.
CPC ......... *G02B 21/365* (2013.01); *G02B 27/225* (2013.01); *G02B 27/2235* (2013.01); *H04N 9/3185* (2013.01); *H04N 13/239* (2018.05); *H04N 13/302* (2018.05); *H04N 13/363* (2018.05); *H04N 13/398* (2018.05)

(58) Field of Classification Search
CPC .............. G02B 27/2235; G02B 27/225; H04N 13/239; H04N 13/363; H04N 13/398; H04N 13/302; H04N 9/3185
See application file for complete search history.

(56) References Cited

U.S. PATENT DOCUMENTS

| | | | | |
|---|---|---|---|---|
| 4,799,763 A | * | 1/1989 | Davis .................... | G02B 17/06 348/42 |
| 5,189,452 A | * | 2/1993 | Hodson ................... | G02B 5/12 353/122 |
| 5,483,307 A | * | 1/1996 | Anderson .......... | G02B 26/0833 353/98 |
| 5,579,772 A | * | 12/1996 | Kinukawa .......... | G02B 21/0012 359/377 |
| 5,642,221 A | * | 6/1997 | Fischer .............. | G02B 27/0172 2/422 |
| 5,661,603 A | * | 8/1997 | Hanano .................. | G02B 5/045 359/622 |
| 5,908,300 A | * | 6/1999 | Walker ................. | G02B 27/017 434/43 |
| 7,068,444 B2 | | 6/2006 | Nishi | |
| 8,113,664 B2 | | 2/2012 | Nagarekawa et al. | |
| 2005/0046796 A1 | * | 3/2005 | Liang ..................... | G02B 23/04 353/7 |
| 2006/0132925 A1 | * | 6/2006 | Domjan ............. | G02B 27/0172 359/630 |
| 2006/0152580 A1 | * | 7/2006 | Andrews .............. | G02B 27/225 348/60 |
| 2008/0058734 A1 | | 3/2008 | Hanft et al. | |

FOREIGN PATENT DOCUMENTS

| | | |
|---|---|---|
| EP | 1 471 375 A1 | 10/2004 |
| TW | I301209 B | 9/2008 |
| WO | WO 94/06048 | 3/1994 |
| WO | WO 2004/086771 A2 | 10/2004 |
| WO | 2014155288 A2 | 10/2014 |

OTHER PUBLICATIONS

International Search Report and Written Opinion for corresponding International Application No. PCT/EP2015/075802 dated Apr. 2, 2016.
British Search Report dated Aug. 10, 2015 for corresponding British Application No. GB1420926.6.
British Search Report dated Jan. 5, 2015 for corresponding British Application No. GB1420926.6.
European Search Report dated Mar. 6, 2017 for corresponding European Application No. 15 791 578.6.
Office Action and search report, along with translations, for corresponding Taiwan Patent Application No. 104137700, dated Nov. 14, 2018 (identified in the Office Action as 107 according to the Minguo Calendar).

* cited by examiner

STEREOSCOPIC VIEWING APPARATUS

The present invention relates to a viewing apparatus for producing a stereoscopic image from video images.

Various optical magnifying apparatus exist for producing stereoscopic images, such as disclosed in the applicant's earlier WO-A-1994/006048.

Various displays also exist for displaying three-dimensional video images, but, in requiring modification of the images, such as polarized or synchronized images, the observer is required to use adapted eyewear, and the resulting image as observed by the observer suffers from reduced resolution and/or lower refresh rates.

It is an aim of the present invention to provide a viewing apparatus which produces a stereoscopic image from video images, and which does not require the use of adapted eyewear.

In one aspect the present invention provides a viewing apparatus for producing a stereoscopic image for an observer, the viewing apparatus comprising: first and second video projectors for projecting respective ones of first and second video images of an object, the first and second images being different images which are one or both of spatially and angularly shifted in relation to the object so as to convey parallax between the images; a mirror arrangement comprising a concave mirror which receives light from the first and second video projectors, the mirror arrangement being located in relation to the first and second video projectors such that focussed images of the object are produced at the mirror arrangement; and a viewing lens for relaying exit pupils corresponding to each of the focussed images as reflected by the mirror arrangement to a viewing plane so as to be viewable at the respective eyes of the observer as a stereoscopic image without use of adpated eyewear; wherein the video projectors comprise first and second video displays which are driven by first and second video signals to display respective ones of the first and second video images, and first and second optical arrangements for focussing light from the respective images as displayed by the first and second displays to the mirror arrangement.

In one embodiment optical axes of the displays are co-axial, with the displays optionally being in opposing relation.

In another embodiment optical axes of the displays enclose an acute angle.

In one embodiment the video signals are provided from three-dimensional modelling or animation systems.

In one embodiment the optical arrangement comprises at least one lens and at least one mirror for directing an optical light path from the display to the mirror arrangement.

In one embodiment the images are spatially shifted images of the object.

In one embodiment the images are angularly shifted images of the object.

In one embodiment the images are spatially and angularly shifted images of the object.

In one embodiment the images are magnified images of the object.

In one embodiment the mirror arrangement comprises a single concave mirror.

In one embodiment the apparatus further comprises: processing circuitry for manipulating the images as projected by the video projectors to remove or accommodate at least one artefact arising from an optical structure of the apparatus.

In one embodiment the at least one artefact includes keystone distortion.

In another aspect the present invention provides a viewing apparatus for producing a stereoscopic image for an observer, the viewing apparatus comprising: first and second video projectors for projecting respective ones of first and second video images of an object, the first and second images being different images which are one or both of spatially and angularly shifted in relation to the object so as to convey parallax between the images; a mirror arrangement which receives light from the first and second video projectors, the mirror arrangement being located in relation to the first and second video projectors such that focussed images of the object are produced at the mirror arrangement; and a viewing lens for relaying exit pupils corresponding to each of the focussed images as reflected by the mirror arrangement to a viewing plane so as to be viewable at the respective eyes of the observer as a stereoscopic image.

In a further aspect the present invention provides a stereoscopic microscope incorporating the above-described viewing apparatus.

In yet another aspect the present invention provides a stereoscopic microscope, comprising: the above-described viewing apparatus; and first and second video cameras for capturing respective ones of first and second magnified images of the object.

In one embodiment the microscope further comprises: an objective lens arrangement for producing first and second magnified images of the object, the first and second video cameras being configured to capture respective ones of first and second magnified images of the object from the image as produced by the objective lens arrangement.

In one embodiment the objective lens arrangement comprises first and second zoom objectives, each for producing a magnified image of the object, the first and second video cameras being configured to capture respective ones of first and second magnified images of the object from the image as produced by the zoom objectives.

In one embodiment optical axes of the zoom objectives enclose an acute angle which corresponds to a viewing angle between the eyes of the observer to the mirror arrangement.

Preferred embodiments of the present invention will now be described hereinbelow by way of example only with reference to the accompanying drawings, in which:

FIGS. 1(a) and (b) illustrate a stereoscopic viewing apparatus in accordance with a first embodiment of the present invention.

Figure 1A:
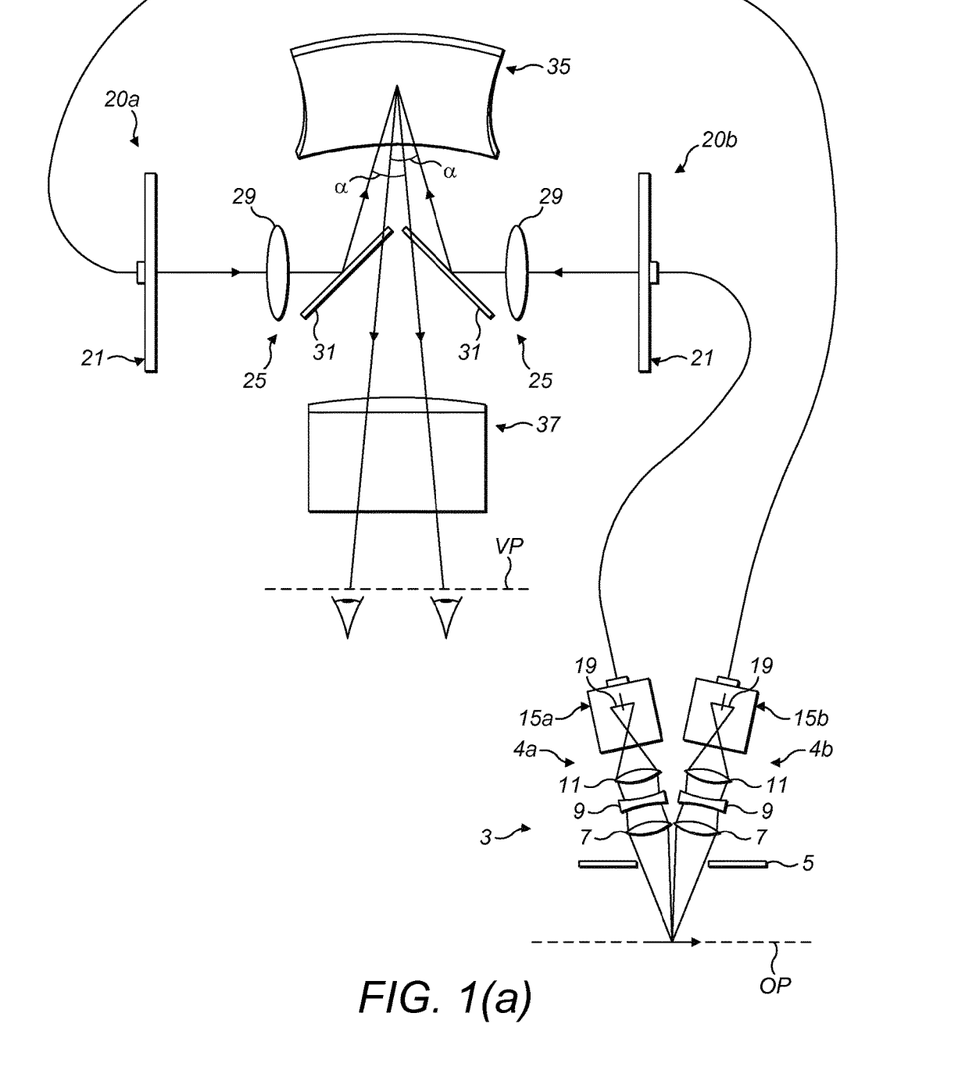
FIG. 1(a) illustrates a stereoscopic viewing apparatus in accordance with a first embodiment of the present invention.
Figure 1B:
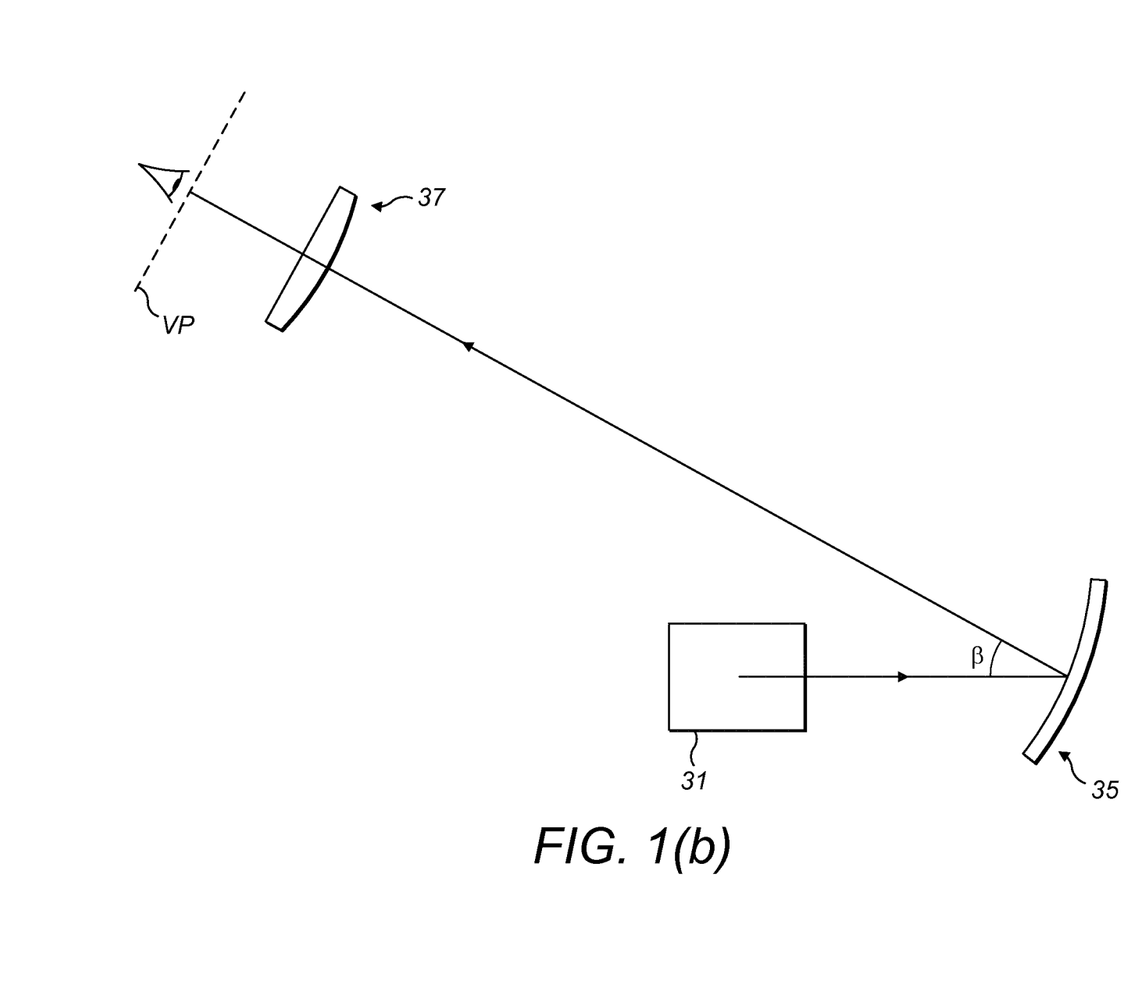
FIG. 1(b) illustrates a partial side view of the viewing apparatus of FIG. 1(a), illustrating the angular relationship between the incident and reflected light paths at the mirror arrangement in the vertical sense.

The viewing apparatus comprises an objective lens arrangement 3 for producing first and second magnified images of an object located at an object plane OP, in this embodiment as defined by an aperture stop 5.

In this embodiment the objective lens arrangement 3 comprises first and second zoom objectives 4a, b which each comprise an objective lens 7 and additional lenses 9, 11, which provide for control of magnification by altering the relative positions of the additional lenses 9, 11 in relation to the objective lens 7.

In this embodiment the optical axes of the zoom objectives 4a, b are arranged in converging relation, such as to provide for parallax between the produced images of the object.

In one embodiment the optical axes of the zoom objectives 4a, b enclose an acute angle which corresponds to the viewing angle between the eyes to a mirror arrangement 35, as will be described in more detail hereinbelow.

The viewing apparatus further comprises first and second video cameras 15a, b which each include a sensor 19 for capturing respective ones of the first and second magnified images of the object, which images are spatially or angularly shifted in relation the object, such that, when the corresponding exit pupils are presented to respective ones of the left and right eyes of an observer, as will be described in more detail hereinbelow, the perceived image is a three-dimensional image.

The viewing apparatus further comprises image projectors 20a, b which project focussed images at a mirror arrangement 35 of light from the respective magnified images of the object as captured by the first and second video cameras 15a, b.

In this embodiment the image projectors 20a, b each comprise a display 21 which is driven to display a respective one of the first and second magnified images of the object as captured by the first and second video cameras 15a, b, and an optical arrangement 25 for providing a focussed image at a mirror arrangement 35 of light from the magnified images as displayed by the respective display 21 of the image projectors 20a, b.

In this embodiment the display 21 comprises a high definition (HD) video display, optionally an ultra-high definition (UHD) display.

In this embodiment the displays 21 of the image projectors 20a, b are disposed with a co-axial arrangement, here in opposing relation. In alternative embodiments the displays 21 could have any angular or spatial relationship.

In this embodiment each optical arrangement 25 comprises at least one lens 29 which provides for the focussed image, and at least one mirror 31 which directs the optical path from the respective display 21 to the mirror arrangement 35.

The viewing apparatus further comprises a mirror arrangement 35 which receives light from each of the images as presented by the displays 21 of the image projectors 20a, b, the mirror arrangement 35 being located such that focussed magnified images of the object are produced at the mirror arrangement 35, and light received by the mirror arrangement 35 is reflected to a viewing lens 37.

In this embodiment the mirror arrangement 35 comprises a concave mirror, here formed as a single mirror, at which focussed or real images of the object are superimposed, and the radius of the mirror is selected such that the exit pupils of the lenses 29 of the optical arrangements 25 of the respective image projectors 20a, b are relayed to the eyes of the observer at a viewing plane VP, as will be described further hereinbelow.

In an alternative embodiment the mirror arrangement 35 could comprise a planar or aspherical mirror and a spherical lens at the surface of the mirror.

The viewing apparatus further comprises a viewing lens 37 for relaying the exit pupils corresponding to each of the images as received by the mirror arrangement 35, to a viewing plane VP, such as to be viewable at the respective eyes of an observer as a stereoscopic image.

The present inventors have found surprisingly that the detail of the observed three-dimensional image is far greater than the detail as would be expected from the "sum" of the detail in the first and second images.

In addition, the present invention enables the video signals to be recorded and presented subsequently as still or moving video.

Figure 2A:
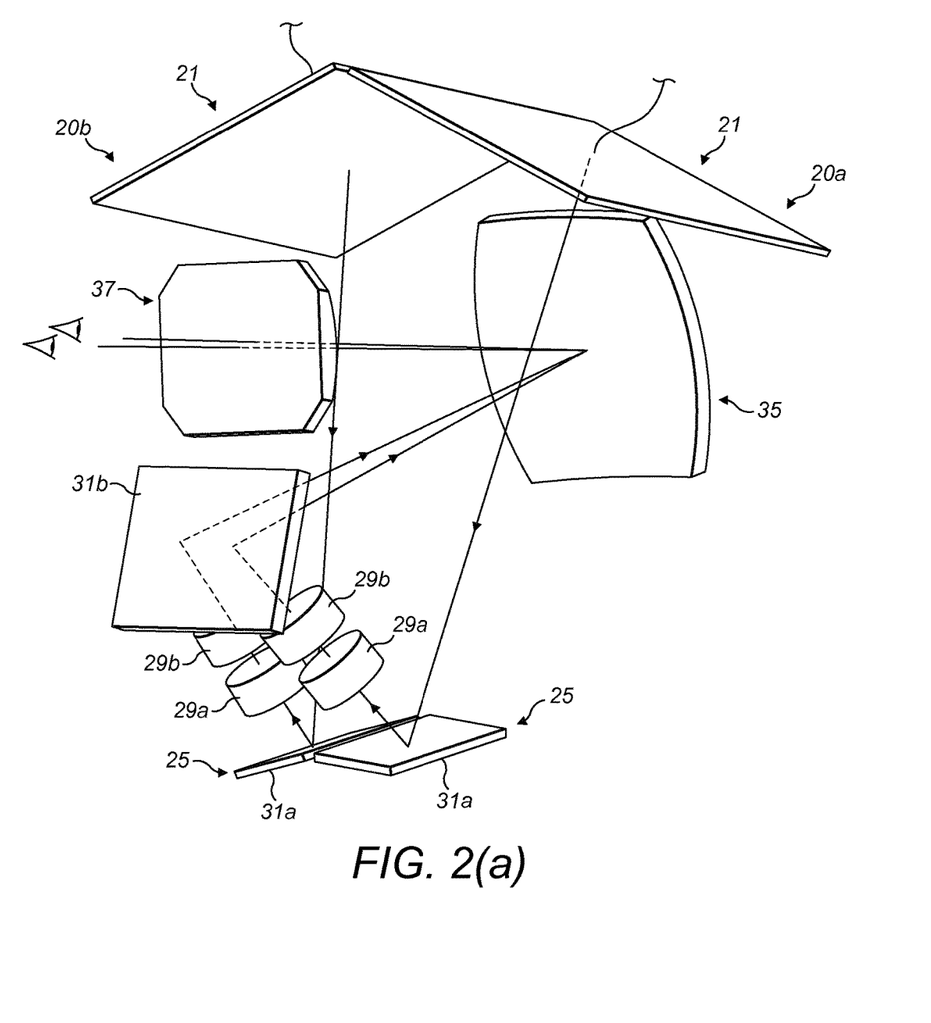
FIGS. 2(a) to (c) illustrate perspective, side and front views of a stereoscopic viewing apparatus in accordance with a second embodiment of the present invention.
Figure 2B:
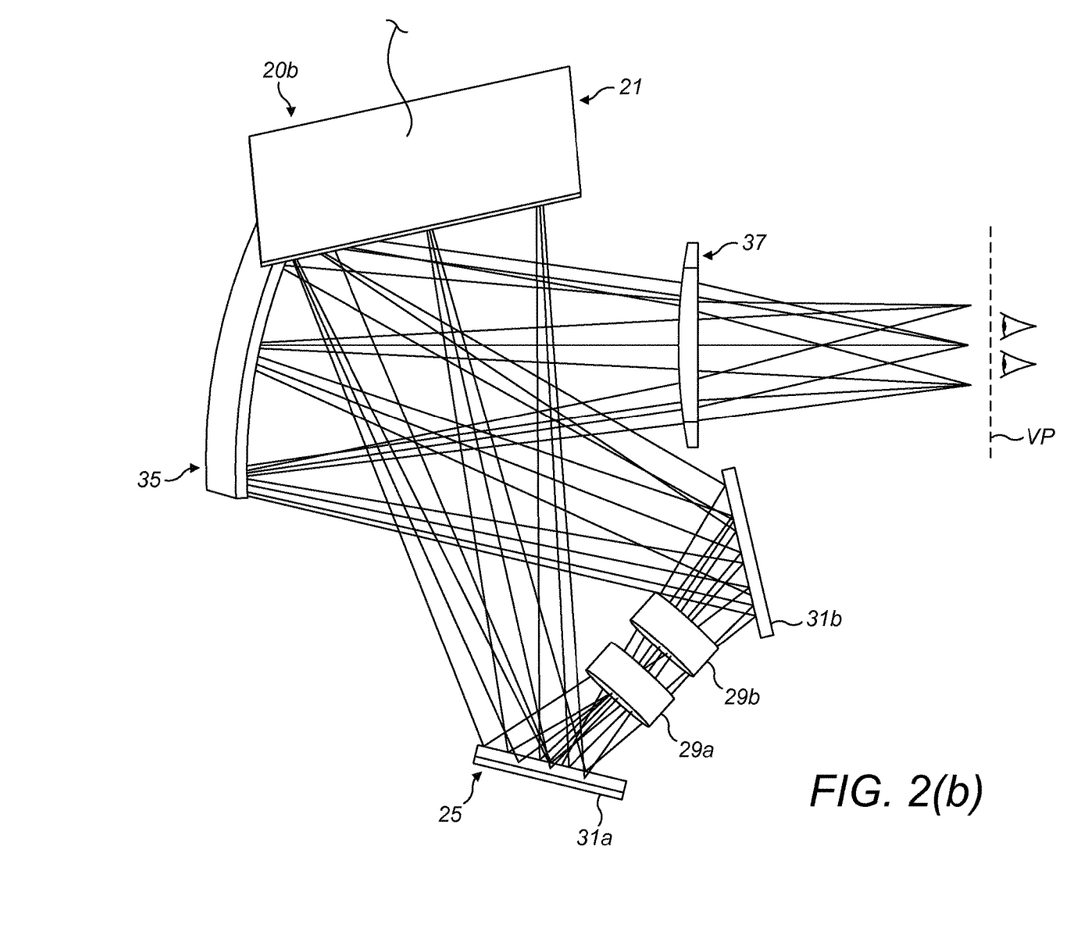
Figure 2C:
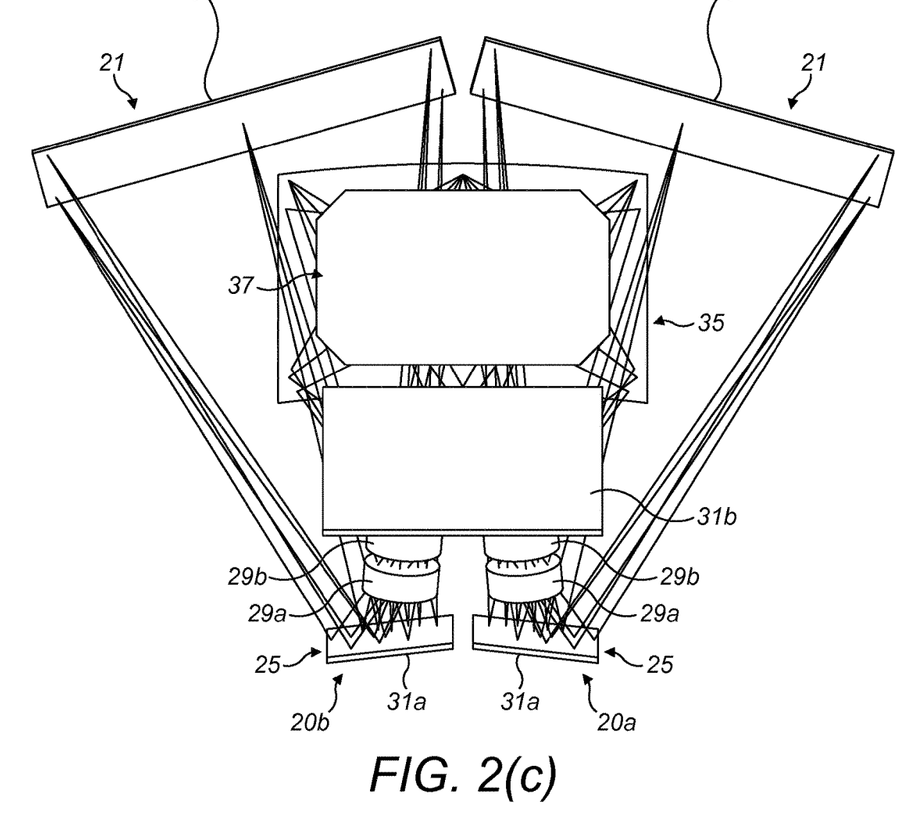

FIGS. 2(a) to (c) illustrate a stereoscopic viewing apparatus in accordance with a second embodiment of the present invention.

The viewing apparatus of this embodiment is very similar to the viewing apparatus of the first-described embodiment. In order to avoid unnecessary duplication of description, only the differences will be described in detail, with like parts being designated by like reference signs.

The viewing apparatus of this embodiment differs from that of the first-described embodiment in that the optical axes of the displays 21 of the image projectors 20a, b are not co-axial but enclose an acute angle, and in that the optical arrangements 25 of the image projectors 20a, b each comprise a plurality of lenses 29a, b and a plurality of mirrors 31a, b, with one of the mirrors 31b being common to each of the optical arrangements 25.

Figure 3:
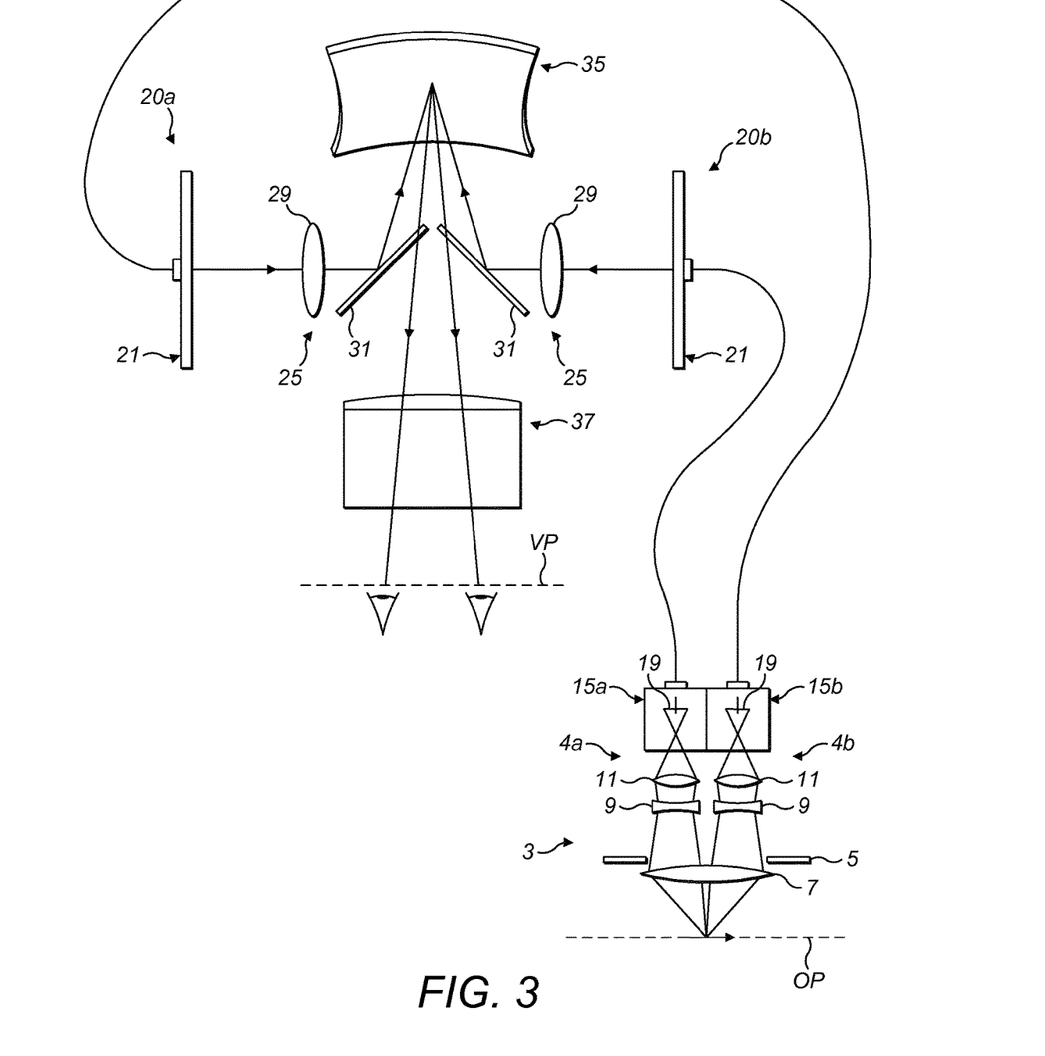
FIG. 3 illustrates a stereoscopic viewing apparatus in accordance with a third embodiment of the present invention.

FIG. 3 illustrates a stereoscopic viewing apparatus in accordance with a third embodiment of the present invention.

The viewing apparatus of this embodiment is very similar to the viewing apparatus of the first-described embodiment. In order to avoid unnecessary duplication of description, only the differences will be described in detail, with like parts being designated by like reference signs.

The viewing apparatus of this embodiment differs from that of the first-described embodiment in that the optical axes of the zoom objectives 4a, b are arranged in parallel, spaced relation, and share a common, converging objective lens 7, such as to provide for parallax between the produced images of the object.

Figure 4:
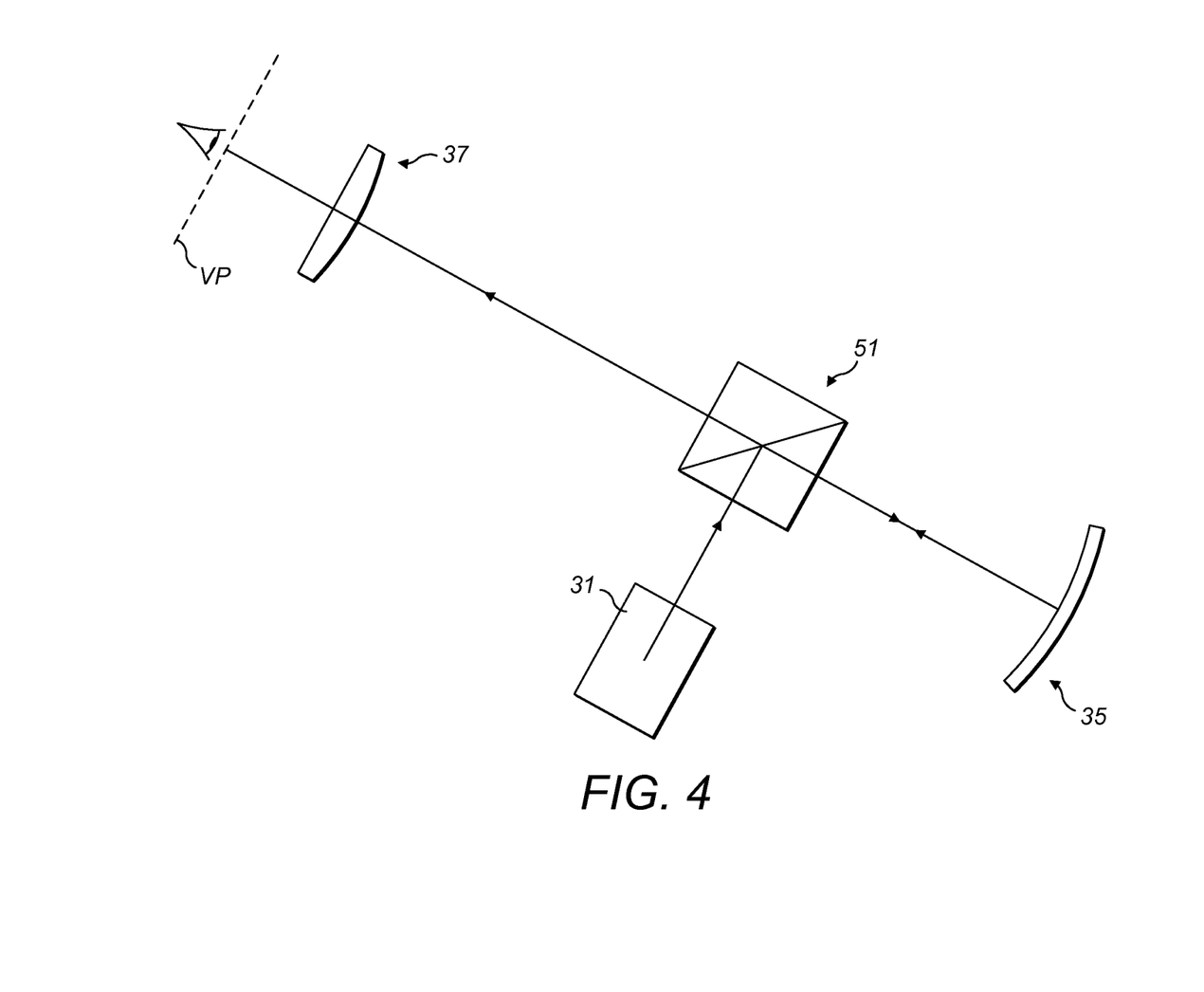
FIG. 4 illustrates a stereoscopic viewing apparatus in accordance with a fourth embodiment of the present invention.

FIG. 4 illustrates a stereoscopic viewing apparatus in accordance with a fourth embodiment of the present invention.

The viewing apparatus of this embodiment is very similar to the viewing apparatus of the first-described embodiment. In order to avoid unnecessary duplication of description, only the differences will be described in detail, with like parts being designated by like reference signs.

The viewing apparatus of this embodiment differs from that of the first-described embodiment in further comprising a beam splitter 51 which is disposed on the optical axis between the mirror arrangement 35 and the viewing lens 37 to receive light from the mirrors 31 of the optical arrangements 25 of the first and second projectors 20a, b, which are disposed in orthogonal relation to the beam splitter 51. As will be seen, this arrangement removes the angular component β between the incident and reflected light paths at the mirror arrangement 35 as present in the first-described embodiment, and consequentially, image distortion, arising from angular projection onto a flat surface as in the first-described embodiment, is much reduced, albeit with reduced light intensity.

In this embodiment the beam splitter 51 is a prismatic cube, but could alternatively be a semi-reflective mirror.

Finally, it will be understood that the present invention has been described in its preferred embodiments and can be modified in many different ways in accordance with the scope of the invention as defined by the appended claims.

For example, although the first and second video images as displayed by the displays 21 of the video projectors 20a, b are derived from a zoom objective arrangement in the first-described embodiment, the displays 21 could alternatively be driven by other video signals, such as provided by modelling or animation systems, for example, 3D CAD modelling systems, with the video signals being provided from views having an angular and/or spaced relation.

In one embodiment processing circuitry can be employed to manipulate the images as displayed by the displays 21 of the video projectors 20a, b, in order to accommodate artefacts arising from the optical structure, such as the keystone distortion, which arises from angular projection onto a flat surface.

The invention claimed is:

1. A viewing apparatus for producing a stereoscopic image for an observer, the viewing apparatus comprising:
    first and second video projectors for projecting respective ones of first and second video images of an object, the first and second images being different images which are one or both of spatially and angularly shifted in relation to the object so as to convey parallax between the images, each video projector comprising a lens;
    a first mirror which receives light from the first and second video projectors;
    wherein the first mirror is located in relation to the first and second video projectors such that focussed images of the object are produced at the first mirror, and the first mirror is a concave mirror with a radius such that exit pupils of the lenses of the video projectors are reflected by the first mirror to a viewing plane so as to be viewable at the respective eyes of the observer as a stereoscopic image; and
    at least one further mirror located in relation to the video projectors and the first mirror such that light from the lenses of the video projectors is reflected onto the first mirror by the at least one further mirror;
    wherein there is an angular component (β) between incident and reflected light paths of the images at the first mirror such that the reflected light path does not intersect the at least one further mirror;
    and wherein the lenses of the first and second video projectors are located side-by-side.

2. The apparatus of claim 1, wherein optical axes of displays are coaxial, with the displays optionally being in opposing relation.

3. The apparatus of claim 1, wherein video signals are provided from three-dimensional modelling or animation systems.

4. The apparatus of claim 1, further including an optical arrangement that comprises at least one mirror for directing an optical light path from a display to the first mirror.

5. The apparatus of claim 1, wherein the images are magnified images of the object.

6. The apparatus of claim 1, further comprising:
    processing circuitry for manipulating the images as projected by the video projectors to remove or accommodate at least one artefact arising from an optical structure of the apparatus.

7. The apparatus of claim 6, wherein the at least one artefact includes keystone distortion.

8. A stereoscopic microscope incorporating the viewing apparatus of claim 1.

9. A stereoscopic microscope, comprising:
    the viewing apparatus of claim 1; and
    first and second video cameras for capturing respective ones of first and second magnified images of the object.

10. The microscope of claim 9, further comprising:
    an objective lens arrangement for producing first and second magnified images of the object, the first and second video cameras being configured to capture respective ones of first and second magnified images of the object from the image as produced by the objective lens arrangement.

11. The microscope of claim 10, wherein the objective lens arrangement comprises first and second zoom objectives, each for producing a magnified image of the object, the first and second video cameras being configured to capture respective ones of first and second magnified images of the object from the image as produced by the zoom objectives.

12. The microscope of claim 11, wherein optical axes of the zoom objectives enclose an acute angle which corresponds to a viewing angle between the eyes of the observer to the mirror arrangement.

13. The apparatus of claim 1, wherein the video projectors comprise first and second video displays which are driven by first and second video signals to display respective ones of the first and second video images, and first and second optical arrangements for focussing light from the respective images as displayed by the first and second displays to the first mirror, each optical arrangement comprising the respective lens.

14. The apparatus of claim 1, wherein each video projector comprises a pair of lenses sharing a common optical axis.

* * * * *